No. 12,730. REISSUED DEC. 3, 1907.

J. O. & H. E. DODGE.

PEN HOLDING AND RELEASING DEVICE.

APPLICATION FILED AUG. 22, 1907.

WITNESSES

E. M. Callaghan

Amos W. Hart

INVENTORS

JAMES O. DODGE

HERBERT E. DODGE

BY Munn & Co.

ATTORNEYS.

THE NORRIS PETERS CO., WASHINGTON, D. C.

UNITED STATES PATENT OFFICE.

JAMES O. DODGE AND HERBERT E. DODGE, OF LOS ANGELES, CALIFORNIA.

PEN HOLDING AND RELEASING DEVICE.

No. 12,730. Specification of Reissued Letters Patent. Reissued Dec. 3, 1907.

Original No. 825,197, dated July 3, 1906, Serial No. 300,067. Application for reissue filed August 22, 1907. Serial No. 389,753.

*To all whom it may concern:*

Be it known that we, JAMES OSBORNE DODGE and HERBERT EGBERT DODGE, citizens of the United States, and residents of Los Angeles, in the county of Los Angeles and State of California, have invented certain new and useful Improvements in Pen Holding and Releasing Devices, of which the following is a specification.

Our improvement has for its object to produce an improved pen holder in which the pen can be quickly removed from the holder when desired without soiling the fingers, as is common to the ordinary penholder.

The invention, therefore, consists in certain novel features of construction, arrangement, and combination of parts, as will be hereinafter fully described, and pointed out in the claims, reference being had to the accompanying drawings, in which—

Figure 1:
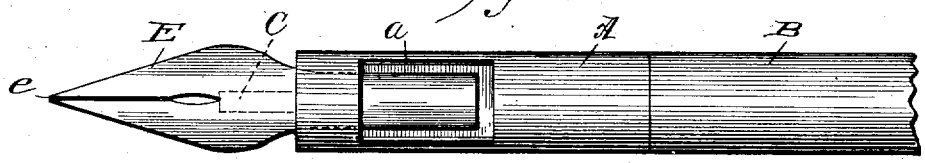
Figure 2:
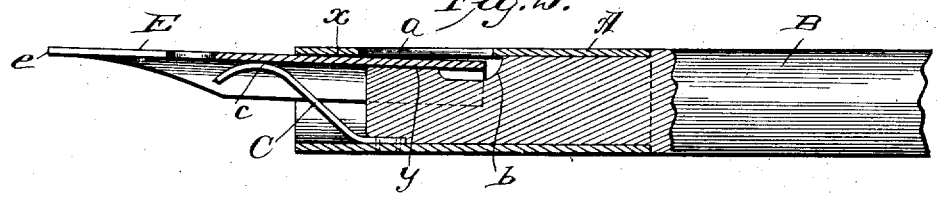
Figure 3:
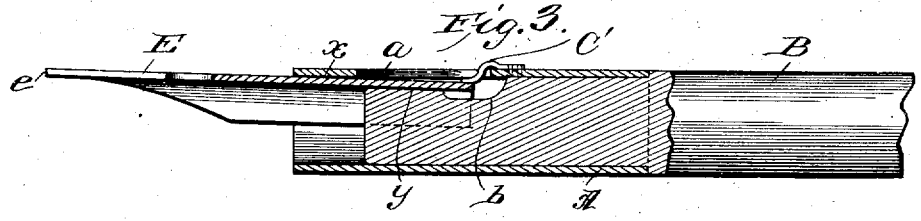
Figure 4:
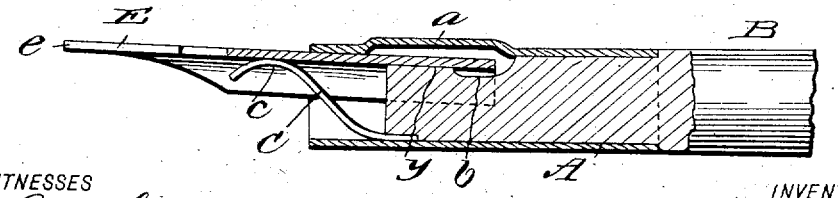

Figure 1 is a plan view of a penholder embodying our improvements. Fig. 2 is a vertical central longitudinal section of the same. Fig. 3 is a similar view showing a modified form of device. Fig. 4 is a detail view illustrating another modified construction.

In carrying out our invention we use the ferrule A, which is of the usual form, except that it has a cut-out portion or slot *a* in its upper part at the point where the reduced front end or stub of a handle B is inclosed. Within the ferrule, near its front end, a light spring C is secured at its lower end to the inner surface of the ferrule A and extends outwardly and upwardly, its upper end *c* forming a transverse curve.

E represents a pen held in the holder by the spring C, pressing upwardly against the lower surface of the same causing the pen to have a rigid bearing at *x* and *y*, the latter being where the rear end of the pen rests upon the reduced front end of the wooden body portion B of the holder. The said reduced front end of the body B has a portion of its upper face cut below the level of the remainder of the same, forming a shoulder *b* to prevent the pen being pushed too far into the ferrule of the holder, and also to form a rigid or firm bearing for the rear edge of the pen.

It will be seen that the pen has two rigid bearings, as at *x* and *y*, and one yielding or spring bearing, and that by relieving the pressure on the pen at the point of spring-bearing, as at *c*, the pen will then fall out of the ferrule of the holder by gravity. As the two rigid bearings must necessarily be in the same relative positions and the spring press lightly against the pen to cause the pen to bear at two such rigid bearings, it is obvious that the spring may be attached to any rigid portion of the ferrule or holder. Thus the spring may be placed as illustrated in Fig. 3, wherein is shown the spring *c'*, secured at one end to the ferrule of the holder at the rear of the slot or opening *a* and pressing tightly on the pen at its extreme rear end, which will cause said pen to bear rigidly and firmly against the reduced forward end of the holder and rigidly and firmly against the inner surface of the ferrule at *x*. If now pressure is applied to the outside of the pen E at the point *e*, as indicated by arrow, the inner end of the pen will slip past the spring C', whereupon the pen will drop out of the ferrule of the holder by gravity.

While we have shown the ferrule A with the cut-out portion *a*, yet we may accomplish the same results by forming simply a recess at this point, such recess being produced by striking up the ferrule in the form shown in Fig. 4, the object of such opening or recess being to allow the rear or inner end of the pen point to rise when it is desired to remove it.

Having thus described our invention, what we claim as new and desire to secure by Letters Patent, is—

1. A penholder comprising two rigid pen-bearing points which are separated longitudinally, and a yielding bearing member located beyond such rigid bearings so as to be in contact with a pen proper at a third point, substantially as described.

2. A pen-holder having two rigid bearings for a pen-point, the same being separated longitudinally and also arranged in different horizontal planes, one being thus adapted to bear on the upper side, and the other on the under side, of a pen-point, and a yielding member which is located adjacent to one of the rigid bearings and forms a third bearing, substantially as described.

3. In a penholder, the combination with the stub or forward end of same, of a ferrule encircling said stub, a rigid bearing-point within the ferrule and a rigid bearing-point on the stub, said rigid bearing-points being longitudinally separated, and a single yielding or spring bearing located longitudinally beyond said rigid bearing-points.

4. In a penholder, the combination with the stub or forward end of same of a ferrule encircling the same, a rigid bearing point within the ferrule and a rigid bearing-point on the stub, said rigid bearings being longitudinally separated, and a yielding member secured at one end to the ferrule and adapted to bear at its free end against a pen-body secured between the ferrule and stub to cause the pen-body to be firmly seated against the aforesaid rigid bearings, whereby releasing pressure of the yielding member will cause the pen to be released from the ferrule by gravity.

5. A pen holding and releasing device consisting of a stub and a ferrule encircling said stub to receive the pen, a rigid bearing point within said ferrule near its forward end said ferrule having a cut-out portion in its upper wall, a rigid bearing-point on the stub beneath said cut out portion and adjacent thereto, and a yielding spring member secured at one end to a rigid portion of the ferrule, and adapted to bear at its free end on a pen inserted in said ferrule to cause the pen to have a rigid bearing at two points within the ferrule whereby releasing pressure of the yielding spring against the pen will cause the pen to be released from the ferrule by gravity.

6. A pen holding and releasing device consisting of a body or handle portion having a reduced forward or stub end, a ferrule fitted on the stub end of said handle, said ferrule having a cut-out portion or slot in its upper wall adjacent to the stub end of said handle, and a yielding spring member secured at its lower end within the ferrule and adapted to bear at its free upper end against the lower face of a pen inserted in said ferrule, whereby releasing pressure of the free end of the spring member will cause the release of the pen from the ferrule by gravity.

JAMES O. DODGE.
HERBERT E. DODGE.

Witnesses to James O. Dodge:
W. D. FINNEY,
W. E. SPINDLER.
Witnesses to Herbert E. Dodge:
S. C. WRIGHT,
H. B. DENSON.